United States Patent Office 3,792,016
Patented Feb. 12, 1974

3,792,016
METAL IMIDAZOLATE-CATALYZED SYSTEMS
Brian K. Hill and J. Alan Kehr, St. Paul, Minn., assignors to Minnesota Mining & Manufacturing Company, St. Paul, Minn.
No Drawing. Filed Jan. 6, 1972, Ser. No. 215,942
Int. Cl. C08g 30/14
U.S. Cl. 260—47 EN         14 Claims

ABSTRACT OF THE DISCLOSURE

Metal imidazolates are catalysts for conventional epoxy resin systems. The combination of a curing agent, epoxy monomer or prepolymer, and metal imidazolate is latent, and cure is effected by heating the system. If a two-part system is desired, the metal imidazolate can be included in either the epoxy resin part or the curing agent part. Preferred metal ions of the metal imidazolates are the metals of Group VIII and Groups I(B) and II(B).

FIELD OF THE INVENTION

This invention relates to a method for curing an epoxide system and to curable epoxide systems which cure rapidly and efficiently at the desired curing elevated temperatures. An espect of this invention relates to compositions containing a latent catalyst which does not substantially affect the shelf life or storage stability of a one-part curable epoxide system, i.e. a system in which an epoxide monomer or prepolymer is premixed with a curative. A further aspect of this invention relates to catalyzed two-part systems, containing a latent curative, in which the pot life of the admixed epoxy resin and curative retains its latent properties at room temperature but cures more rapidly and efficiently at elevated temperatures.

Still another aspect of this invention relates to curable epoxide systems and curing methods wherein the cure is initiated or accelerated or catalyzed by less than a stoichiometric amount of a catalytic agent derived from an imidazole.

Description of the Prior Art

In the epoxy resin art, it is desirable to catalyze (i.e. initiate or accelerate) the opening of the 1,2-epoxide or vic.-epoxide (oxirane) ring, thereby facilitating polymerization and/or crosslinking reactions which provide the desired properties. A wide variety of compounds, generally polyfunctional, are known to act as curative (i.e. co-curatives, also called hardeners or crosslinkers in some contexts) for epoxide monomers or prepolymers. Although tough, durable, thermoset solids can be obtained through the interaction of the epoxide and the curative, many curatives are slow to react, even at temperatures in the conventional curing range of about 100–200° C. Several different amine-type compounds have been used as curatives which, in more or less stoichiometric quantities, can provide a rapid and complete cure. One of the useful classes of curing agents disclosed in the literature constitutes imidazole and its derivatives.

Imidazole and its derivatives are characterized by the structural formula

the 1-position being commonly referred to as the "pyrrole" nitrogen, and the 3-position being commonly referred to as the "pyridine" nitrogen. Theoretical studies such as Farkas et al., J. Applied Polym. Sci. 12, 159 (1968) have led to the conclusion that the

moiety of the 1-position reacts with a 1,2-epoxide ring resulting in the substitution of an imidazole substituent on the first carbon, leaving a hydroxyl attached to the second carbon. This ring-opening reaction appears to be the initial step in the curing of the epoxide.

An imidazole-cure is rapid and efficient at elevated temperatures and, given time, will occur even at normal ambient temperatures. The effectivness and speed of the reaction can be either an advantage or a disadvantage, depending upon the method of using the epoxy resins. A rapid cure at temperatures above 50 or 100° C. is generally desirable, but there are many applications of epoxide chemistry wherein any amount of curing at room temperature or moderately elevated temperatures is disadvantageous. For example, in 1-part curable epoxy resin systems, it is desirable that the uncured system be stable at room temperature for at least a period of weeks, preferably months. In typical applications of two-part systems, it is desirable that the pot life of the system, after admixture of the two parts, be long enough to avoid premature gelation of the system and to allow for casting, coating, shaping, laminating, or impregnating operations.

To extend the pot life of imidazole-containing epoxy systems and/or to provide storage-stable 1-part curable epoxide systems curable with an imidazole curative, various means have been proposed to render the imidazole or imidazole derivative latent at room temperature but substantially fully reactive in the conventional curing temperature range, e.g. 100–200° C. The thus-modified imidazole can be considered a "latent" curing agent at room temperature, which agent is "de-latentized" at elevated temperatures.

One technique for modifying an imidazole so as to convert it to a "latent" curing agent is described in U.S. Pat. 3,356,645 (Warren), issued Dec. 5, 1967. According to this patent, a mole of an imidazole is reacted with 1–2 moles of an acid such as acetic acid to form an amine salt which extends the room temperature pot life of the curable epoxide system up to about 3 weeks. A rapid cure is effected by heating the system. It is reasonable to expect that the amine salt comprises a 1-protonated imidazole cation; therefore, the

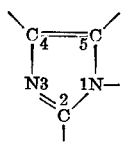

moiety described previously has been blocked.

This amine salt approach is economical in the sense that a relatively small number of moles of imidazole can be reacted with an excess over stoichiometry of a relatively inexpensive acid such as acetic acid, but the amine salt product is too easily decomposed to be suitable for those systems in which the pot life or shelf life is preferably more than a few weeks at room temperature.

It has also been found that "complexes" (i.e. coordination compounds) of imidazoles and suitable metal salts provide truly latent curatives or curative-catalysts which can be activated or "de-latentized" in the conventional curing temperature range. See U.S. Pat. 3,553,166 (Anderson et al.), issued Jan. 5, 1971. The structures of the metal salt-imidazole "complexes" or coordination compounds have been under investigation since at least 1954, and appear to have been well worked out in studies carried out in the middle 1960's. From all the available evidence, it is reasonable to assume that the "pyrrole" moiety of the imidazole behaves differently when imidazole is a ligand. The ligand character of the imidazole is destroyed or weakened at temperatures above about 100° C., however, thus restoring the curative properties of the imidazole. The metal salt-imidazole coordination compounds are thus latent, but are not simple catalysts in that the imidazole liberated during cure makes a contribution to the properties of the cured material. Coordination numbers of typical transition metal salts or the like are in the range of 2-6, or even higher, and it is often necessary to use several moles of imidazole per mole of metal salt in order to form the coordination compound efficiently. Furthermore, purification of the metal salt-imidazole coordination compounds often involves great care, since unreacted imidazole and other contaminants should be eliminated as completely as possible. Since the imidazole ligand is more of a latent curative than a true latent catalyst, its contribution to the cured product must be evaluated and considered before the technique described in the Anderson et al. patent can be adapted to a standard commercial formulation already containing a curative such as dicyandiamide.

Accordingly, this invention contemplates providing a latent initiator or accelerator which acts as a true catalyst for the opening of the epoxide ring at elevated temperatures and which is suitable for addition to 1-part or 2-part epoxy systems. This invention further contemplates a 1-part epoxide system catalyzed with a derivative of an imidazole wherein the system has a storage life of at least several weeks at normal ambient temperatures. This invention further contemplates a 2-part curable epoxide system with a lengthy pot life at normal ambient and moderately elevated temperatures, the 2-part system being catalyzed with a latent catalyst derived from an imidazole. This invention also contemplates providing a latent catalyst and epoxy systems cured with the assistance of this catalyst, the latent catalyst being synthesized with a minimum amount of imidazole and being isolated by a relatively simple purification procedure.

SUMMARY OF THE INVENTION

Briefly summarized, this invention involves the use of the following compounds as catalysts (initiators or accelerators) for curable epoxide systems:

(II) $\quad ML_m$ where

M is a suitable metal, e.g. a metal of Group VIII, Group I-B or Group II-B of the Periodic Table;
L is an imidazole, i.e., an imidazole nucleus wherein a proton has been removed from the "pyrrole" position (i.e. 1-position) of the imidazole or imidazole derivative; and
m is the valence of M, e.g. 1 or 2.

Compounds of Formula II are known, as is shown by Bauman et al., Inorganic Chemistry 3, pages 368–373 (1964). These compounds have apparently never been used in curable epoxide systems and have apparently never been suspected of having a catalytic effect upon the curing of epoxides. First, the imidazolates apparently lack the

"pyrrole" moiety believed to be the reactive functional group of the imidazole in the initiation step described by the previously cited Farkas et al. article. Therefore, neither the curing nor the "de-latentizing" mechanism of the curable systems of this invention can be explained by analogy to prior art mechanisms. Second, evidence reported in the literature suggests that the above-described metal imidazolates are not simple salt-like structures, but may be polymers quite different in structure from imidazole or its 1-protonated salts or its coordination compounds. This evidence strongly suggests that the restoration of the "pyrrole" moiety is not likely to be favored even at temperatures above 100 or 150° C. Thus, the "de-latentizing" mechanism of this invention is simply not known. Third, there is evidence that, unlike the metal salt-imidazole coordination compounds, the metal imidazolates of this invention can provide a non-latent catalytic effect in non-latent, room temperature-curable epoxide systems as well as a latent effect in systems cured with dicyandiamide, anhydrides, dihydrazides, and similar latent curatives. Fourth, unlike imidazole or its 1-protonated salts or its coordination compounds, the metal imidazolates are not curing agents in and of themselves, though they efficiently initiate or accelerate the opening of the epoxide ring at temperatures above 50° C., preferably above 100° C. The prior art imidazole derivatives make some contribution to the properties of the cured product, even when blended with major amounts of other curatives. Although this invention is not bound by any theory, it is assumed that, by contrast, the metal imidazolates are catalysts only, and preferably should be combined with at least one curing agent to achieve a true cure. Since the metal imidazolates used in this invention are effective in catalytic amounts as small as 0.03 part by weight per 100 parts of curable epoxide monomer or prepolymer, and since these agents generally accelerate the reaction between the 1,2-epoxide ring and conventional curing agents (e.g. of the dicyandiamide, dihydrazide, and anhydride types), this assumption appears to be justified. Some of the slower anhydride-type curatives are accelerated by a factor of 12 or more when combined with the catalytic agents of this invention, particularly when the cure is carried out at temperatures in excess of 100° C.

There is an important place in the art for a true catalyst which asists the curing agent without directly affecting the properties of the epoxide-curative reaction product. Because catalytic amounts of the metal imidazolate are effective, the skilled technician can add very minute amounts of the metal imidazole to a known, well-understood system, thereby avoiding the risk of reformulating the known system to take into account some curative effect or side reaction or alteration of properties that can result upon the addition of a prior art imidazole-type latent curative. Furthermore, simple acceleration of a curing reaction provides both the benefit of reduced reaction time and a reduced risk of adverse effects caused by prolonged or excessive heating.

Thus, curable one-part systems formulated according to this invention typically contain (1) a catalytic amount of the metal imidazolate, (2) a suitable aliphatic, cycloaliphatic, aromatic, or heterocyclic epoxide, (3) a suitable curing agent such as dicyandiamide, an anhydride of a polycarboxylic acid, a dihydrazide, a diaminodiarylsulfone, or similar polyfunctional curing agent, and, optionally, (4) suitable fillers, extenders, flexibilizers, or pigments, including vinyl or olefinic or acrylic polymers, colloidal silica, finely divided inorganic salts, etc.

In two-part systems, the metal imidazolate catalytic agent may be included in either the curable epoxide part or the curing agent part.

DETAILED DESCRIPTION

In the epoxy resin art, a "latent" catalyst (also called an accelerator or initiator) is one which does not readily react with the 1,2-epoxide ring at ordinary ambient temperatures, but which can be made to react readily under certain specific conditions, typically temperatures above 50° C. and, in industrial practice, above 100° C. A latent catalyst can therefore be included in a 1-part curable epoxy system which can be stored for weeks or months and yet remain substantially free of gelling or hardening due to polymerization or crosslinking. Two-part systems containing the "latent" catalyst can be blended and then coated, molded, laminated, cast, or used as an impregnating material in a leisurely fashion, since the pot life is extremely long unless the mixture is heated.

One-part and two-part systems formulated according to the teachings of this invention contain at least one compound containing a vicinal or 1,2-epoxy group. These compounds are also known as epoxides and can be mono- or polyepoxides, as is well known in the art. Curable, one-part epoxy systems can be obtained according to this invention by simply mixing together the catalysts of the invention with additional curing agents and one or more of these mono- or polyepoxides at ambient temperatures. If desired, a conventional organic solvent can be used to facilitate mixing. Preferred uncured systems are insensitive to water; hence, the results of initiating the curing reactions do not vary due to atmospheric humidity.

Two-part systems are formulated in a similar manner, except that either the epoxide or the curing agent is omitted from Part A or Part B, as the case may be. When a non-latent polyamine curative (i.e. a curative or "accelerator" non-reactive at room temperature) is included in the curative part of the two-part system, the metal imidazolate catalysts of this invention can assist in the room temperature cure obtained by blending the two parts, further suggesting a lack of any analogy between the catalytic mechanism of the metal imidazolates and the effects obtained with prior art "latentized" imidazole catalysts. Thus, although the primary emphasis of this invention is on latent curable epoxide systems and 2-part systems with an extensive pot life, improved non-latent 2-part systems can also be formulated so as to contain a metal imidazolate catalyst in the A or B part; see the results subsequently described in Example 7.

Epoxides suitable for use in this invention can be aliphatic, cycloaliphatic, aromatic or heterocyclic and will typically have an average epoxy equivalency (i.e. the number of epoxy groups contained in the average molecule) or from about 1.7 to 6.0, preferably 2 or 3, this value being the average molecular weight of the epoxide divided by the epoxide equivalent weight. The epoxy equivalent weight, which is determined by multiplying the sample weight by 16 and dividing by the number of grams of oxirane oxygen in the sample, is typically greater than 100 for commercially useful curable systems. These materials are variously referred to as epoxide "monomers" or "prepolymers" and in any event can contain repeating units, e.g. repeating ether units. Typical of such epoxies are the glycidyl-type epoxy resins, e.g. the diglycidyl ethers of polyhydric phenols and of novolak resins, such as described in "Handbook of Epoxy Resins," by Lee and Neville, McGraw-Hill Book Co., New York (1967).

Another useful class of epoxies has a structure of the following type:

(III)

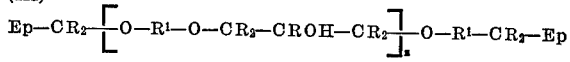

or (IV)      $R^1(OCR_2—Ep)_n$ where

Ep is an epoxide ring,
R is hydrogen, or a non-rindering aliphatic group (e.g. methyl);
$R^1$ is a divalent aliphatic or aromatic radical; and
z is a number from 0 to about 5.

In Formula IV, n is a number from 1 to 6.

Typically, these epoxies are glycidyl ethers of polyhydric phenols obtained by reacting a polyhydric phenol or aliphatic polyol with an excess of chlorohydrin, such as epichlorohydrin, e.g. the diglycidyl ether of Bisphenol-A or of resorcinol, 1,4-butane diol, or the like. Further examples of epoxies of this type which can be used in the practice of this invention are described in U.S. 3,018,262 (Schroeder), issued Jan. 23, 1962.

The preferred cycloaliphatic epoxide monomers or prepolymers preferably contain at least one 5- or 6-membered carbocyclic ring (or heterocyclic ring with equivalent properties) on which is substituted the epoxide functional group. In polycyclic cycloaliphatic epoxides, the two rings are preferably independent and preferably joined by a bridging radical containing at least one ester or ether linkage. A plurality of these ester or ether linkages can provide flexibilizing properties in the cured system. Further examples of cycloaliphatic epoxide compounds are described in U.S. Pat. No. 3,117,099 (Proops et al.), issued Jan. 7, 1964.

There are a host of commercially available epoxies which can be used in this invention, including the diglycidyl ether of Bisphenol-A (e.g. "Epon" 828, "EpiRez" 522-C, "Araldite" 7072, "Epon" 1002 and "DER" 332), mixtures of the diglycidyl ether of Bisphenol A with an alkyl glycidyl ether (e.g. "ERL" 2795), vinylcyclohexene dioxide (e.g. "ERL"–4206), 3,4-epoxycyclohexylmethyl-3, 4-epoxycyclohexane carboxylate (e.g. "ERL"–4221), 3,4 - epoxy-6-methylcyclohexylmethyl-3,4-epoxy-6-methylcyclohexane carboxylate (e.g. "ERL"–4201), bis(3,4-epoxy-6-methylcyclohexylmethyl)adipate (e.g. "ERL"–4289), bis(2,3-epoxycyclopentyl)ether (e.g. "ERL"–0400), aliphatic epoxy modified with polypropylene glycol (e.g. "ERL"–4050 and "ERL"–4052), dipentene dioxide (e.g. "ERL"–4269), epoxidized polybutadiene (e.g. "Oxiron" 2001), silicone epoxy (e.g. "Syl–Kem" 90), 1,4-butanediol diglycidyl ether (e.g. "Araldite" RD-2), polyglycidyl ether of phenolformaldehyde novolak (e.g. "DEN"–431 and "DEN"–438) resorcinol diglycidyl ether (e.g. Ciba "ERE"–1359), and epoxidized unsaturated esters of carboxylic acids having more than six carbon atoms, e.g. epoxidized soybean oil. ("Epon" is a trademark of Shell Chemical Co.; "EpiRez" is a trademark of Jones-Dabney Co.; "Araldite" is a trademark of Ciba Products Co.; the various "DER" and "DEN" designations are trade designations of Dow Chemical Co.; the "ERL" designations are trade designations of Union Carbide Plastics Division– "Syl Kem" is a trade designation of Dow Corning; "Oxiron" is a trademark; and "ERE–1359" is a trade designation of Ciba Products Co.

Any of the conventional filler materials can be added to the curable systems of this invention including pigments and the like. Curable systems of this invention can be used in the conventional manner to make coated, impregnated, or molded products, e.g. structural panels and the like.

The curing agents preferred for use in curable compositions of this invention include relatively non-acidic curing agents, or curing agents which do not de-stabilize metal imidazolates, e.g. the acid anhydrides of carboxylic acids, compounds containing the hydrazine function (—CO—NH—NH₂ or an epoxide-curing derivative thereof), diaminediarylsulfones, and compounds of the dicyandiamide type. Analogs of dicyandiamide which are used to cure epoxies are disclosed in the aforementioned Anderson et al. Pat. 3,553,166. These classes of curatives are accelerated by the catalysts of this invention; furthermore, these curatives are generally latent at room temperature or moderately elevated temperatures. Curing with methylene dianiline and similar diamino curatives or "accelerators" (with the exception of the diaminodiarylsulfones) is apparently not significantly accelerated by the metal imidazolate catalysts; hence, these curatives are less preferred.

The preferred acid anhydrides include tetrahydrophthalic anhydride, chlorendic anhydride and similar monoanhydrides and bicyclic anhydrides, hexahydrophthalic anhydride, and the like. The preferred dihydrazides are the aliphatic dihydrazides such as adipic or azelaic dihydrazide, but aromatic dihydrazides such as isophthalic dihydrazide are also useful.

The catalysts most preferred for use in these epoxy systems have the general formula:

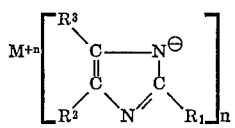

where $M^{+n}$ = Ag⊕, Cu⊕, Cu⊕², Cd⊕², Zn⊕², Hg⊕², Ni⊕² and Co⊕², and $R^1$, $R^2$, and $R^3$ are preferably hydrogen or a non-hindering aliphatic or aromatic radical, or the residue of a fused carbocyclic or heterocyclic ring or other non-hindering substituents which do not interfere with the formation of a stable imidazolate salt.

Since the stable imidazolate salts appear to have polymeric character (as will be shown subsequently), steric hindrance or interference can occur between separate imidazolate nuclei, e.g. the 4-substituent of one nucleus interfering with the 5-substituent of another. The possibility of steric hindrance is increased when $n$, the valence of M in Formula V is greater than 2. Accordingly, metals of Groups I–B, II–B, VIII, and other metals having a valence of 1 or 2 are preferred embodiments of M. Methyl, ethyl, n-propyl, i-propyl, n-butyl, i-butyl, and the $C_2$–$C_4$ unsaturated aliphatic radicals are generally preferred for lower steric hindrance, although more than one branched chain $C_3$ or $C_4$ aliphatic group per imidazole nucleus is not preferred. Monocyclic aromatic groups, preferably fused to the 4 and 5 positions, are generally the least hindering of the aromatic substituents; thus benzimidazole and its derivatives are useful in this invention. The presence of large hydrocarbon substituents or tri-substitution with three smaller hydrocarbon substituents can alter the solubility characteristics of the imidazole and the imidazolate product. In such cases it may be desirable to use polar solvents other than water for the imidazolate-forming reaction medium.

As pointed out previously, the low effective concentrations of catalyst used in this invention (as low as 0.03% based on epoxy resin) indicate a true catalytic effect. It appears likely that the metal imidazolate does not form a part of the ultimately obtained epoxide-curing agent reaction product.

The imidazolate salts are prepared by adding a slight excess of imidazole to an aqueous solution of the metal salt, and adjusting the pH of the solution by adding aqueous base until all the metal ion is precipitated as the metal imidazolate. The metal imidazolate is insoluble in water and is filtered from the aqueous mixture, washed sequentially with water, ethanol and ether or acetone.

It is extremely important to wash the crude salt carefully with organic solvents to remove any uncombined imidazole. Free imidazole cures epoxy resins very readily and even trace amounts can cause early cure.

The metal imidazolate does not appear to be a simple salt, but may have some polymeric character. See the Bauman et al. article cited previously, page 373. For example, silver(I) 2-ethyl-4-methylimidazolate dissolved in chloroform showed a number average molecular weight of 6,272 at a 8.45 wt. percent concentration. At 7.86%, $M_N$=7,250 and at 3.22%, $M_N$=16,167. The method used in this analysis is described by Neumayer, Analytica Chemica Acta 20, 520 (1959).

When the metal imidazolate is added to a latent mixture of epoxy resin and curing agent, the resulting system remains latent, but the cure of the system is more rapid with the metal imidazolate catalyst than the comparable system without catalyst.

The use of the catalyst facilitates the utilization of certain curing agents and epoxy resins. For example, "EpiRez" 522–C (trademark of Jones-Dabney Co.) which is:

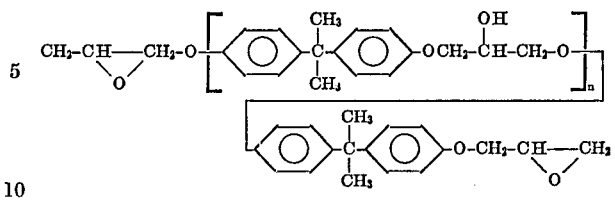

with an epoxy equivalent weight of 625, when cured with azelaic dihydrazide yields a resin with very desirable impact resistance, but the time for cure is relatively long. Addition of metal imidazolate to the system provides a shorter gel time and a shorter cure time and makes the system commercially usable.

The "gel time," the time required for the resin system to "set," is generally shorter than the complete cure time. In gel time tests used herein, a small sample is placed in a heated cup and stirred continuously until the material forms a ball on the end of the stirrer. The gel time tests were performed on small (0.1±0.02 g.) samples in cups (1.2 cm. diameter by 0.5 cm. deep) drilled into a hot plate. The hot plate temperature was measured by strategically placed thermocouples, and maintained at 150° C. Samples of the uncured resin and curing agent with and without catalyst were mixed for five minutes prior to testing to ensure uniform dispersion.

The following non-limiting examples illustrate the invention.

EXAMPLE 1

(A) Preparation of nickel(II) imidazolate

A solution of nickel(II) chloride (23.8 gm.

$$NiCl_2 \cdot 6H_2O$$

in 200 ml. $H_2O$) was slowly added to a stirred solution of imidazole (54.5 gm. imidazole in 1000 ml. $H_2O$). A violet precipitate was formed. A 2.0 molar solution of sodium hydroxide was added slowly to give a pH of 13 (about 200 ml. added) and the precipitate turned green. The mixture was stirred continuously and slowly overnight and the precipitate became yellow. The yellow solid was filtered from the mixture on a fritted glass filter, washed three times with distilled water, twice with reagent grade methanol and once with anyhdrous ether. The yellow salt, nickel(II) imidazolate, was allowed to air dry. The infrared spectra of the salt showed no absorption in the >N—H region. Calculated: 30.4% Ni; found: 29.6%, 29.6% Ni.

(B) Use of nickel(II) imidazolate as catalyst

Ten grams of "Epon" 828 (trademark of Shell Chemical Co. for the diglycidyl ether of bisphenol A) was mixed with dicyandiamide (0.7 gm.) and various quantities of nickel(II) imidazolate. The gel time (minutes:seconds) was determined on 0.1±0.02 gram portions at 150° C. Results are tabulated below. The amount of catalyst is in parts per hundred (phr.), based on the diglycidyl ether.

| Test | Catalyst (p.h.r.) | Gel times in minutes:seconds | | | |
|---|---|---|---|---|---|
| | | 1st trial | 2nd trial | 3rd trial | Average |
| 1 | None | >30:00 | >30:00 | >30:00 | >30:00 |
| 2 | 0.0313 | 5:50 | 5:50 | | 5:50 |
| 3 | 0.0625 | 3:40 | 3:50 | | 3:45 |
| 4 | 0.125 | 3:25 | 3:15 | 3:20 | 3:20 |
| 5 | 0.250 | 2:45 | 2:40 | | 2:43 |
| 6 | 0.500 | 1:45 | 1:55 | 1:55 | 1:52 |
| 7 | 1.00 | 1:02 | 1:07 | 1:05 | 1:05 |
| 8 | 2.00 | 0:50 | 0:45 | 0.40 | 0:45 |
| 9 | 4.00 | 0:33 | 0:30 | | 0:31 |
| 10 | 8.00 | 0:24 | 0:24 | | 0:24 |
| 11 | 16.00 | 0:27 | 0:26 | | 0:26 |

EXAMPLE 2

(A) Dicyandiamine, dihydrazide, and anhydride curing reactions

This example compares the gel time of various commercial epoxy resins with various curing agents without catalyst and with 0.5% (by weight) nickel(II) imidazolate catalyst (based on epoxy resins) added. Significant decrease in gel time is observed.

| | | Gel time in minutes:seconds | |
|---|---|---|---|
| Epoxy resin | Curing agent | Without catalyst | With Ni(Imid)$_2$ |
| Epon 828 [1] | THPA [2] | 25:00 | 2:00 |
| Epon 828 | Dicyandiamide | 15:00 | 1:32 |
| Epon 828 | Adipic dihydrazide | 1:36 | 0:56 |
| DEN 431 [3] | THPA | 28:00 | 1:20 |
| DEN 431 | Dicyandiamide | 8:00 | 1:03 |
| DEN 431 | Adipic dihydrazide | 1:48 | 0:42 |
| ERL 4221 [4] | THPA | 6:15 | 0:55 |
| ERL 4221 | Dicyandiamide | 34:00 | 18:25 |
| ERL 4221 | Adipic dihydrazide | 46:30 | 17:00 |

[1] "Epon" is a trademark of Shell Chemical Co.; see Example 1(B).
[2] THPA = tetrahydrophthalicanhydride.
[3] "DEN 431" is a trade designation of Dow Chemical for a novolak-type glycidyl ether.
[4] "ERL 4221" is a trade designation of Union Carbide for a cycloaliphatic epoxide.

(B) Methylenedianiline curing reactions

It was found that 0.5 wt. percent nickel(II) imidazolate did not accelerate the curing of the "EPon" 828 or "ERL 4221" when methylenedianiline was used as the curing agent. Under these same conditions, some acceleration of the curing of "DEN 431" was noted, however.

EXAMPLE 3

This example describes the use of various metal imidazolates as catalysts. Gel times were determined at 150°±3° C. on a mixture of 10.0 g. "Epon" 828 (see Example 1), 0.7 g. dicyandiamide and 0.05 g. of metal imidazolate. The results are tabulated below, and a description of the method of preparation of each metal imidazolate is given.

| | | Gel times in minutes:seconds | | |
|---|---|---|---|---|
| Test | Metal imidazolate | Test #1 | Test #2 | Test #3 |
| Control | None | >30:00 | >30:00 | >30:00 |
| 1 | Ag(C$_3$N$_2$H$_3$) | 3:30 | 3:45 | 3:45 |
| 2 | Co(C$_3$N$_2$H$_3$)$_2$ | 1:32 | 1:28 | 1:30 |
| 3 | Hg(C$_3$N$_2$H$_3$)$_2$ | 3:32 | 2:40 | |
| 4 | Cd(C$_3$N$_2$H$_3$)$_2$ | 1:27 | 1:29 | 1:31 |
| 5 | Cu(C$_3$N$_2$H$_3$)$_2$ | 1:03 | 1:05 | 1:03 |
| 6 | Cu(C$_3$N$_2$H$_3$) | 1:23 | 1:18 | 1:25 |
| 7 | Zn(C$_3$N$_2$H$_3$)$_2$ | 2:05 | 2:07 | |

Preparation of silver(I) imidazolate

Imidazole (22.7 g., 0.33 moles) is added to a vigorously stirred solution of silver nitrate (56.7 g., 0.33 moles) in 1250 ml. distilled water. The solution is maintained at a temperature of 2° to 5° C., and a precipitate forms immediately. A 0.75 molar solution of sodium hydroxide is subsequently added to the mixture, drop-by-drop, at an addition rate of 15 ml./min. until about a pH=7.0 is attained. The pH of the solution is constantly measured using an "Orion-Model 701 pH Meter" with double junction reference and glass electrode. When a pH=7.0 is reached, the addition rate of the sodium hydroxide solution is decreased to 5 ml./min. until a pH—10.5±0.05 is attained. The agitation is continued for another 20 minutes (digestion period). Subsequently, the mixture was suction filtered on a 10-20 micron fritted glass filter and washed sequentially with 400 ml. distilled water, 400 ml. absolute ethanol and 400 ml. anhydrous diethyl ether. The resulting white powdery product was air dried. Infrared analysis of the salt revealed no >N—H structure, and chemical analysis for silver gave 61.2%, 61.7% Ag found; 61.7% Ag calculated.

Preparation of cobalt(II) imidazolate

Imidazole (25 gm.) and Co(NO$_3$)$_2$·6H$_2$O (15 gm.) was added to 600 ml. of distilled water which was stirred continuously. A pink precipitate formed, which was filtered from the solution and discarded. Sodium hydroxide solution (0.1 M) was added slowly to the filtrate until it reached a pH of 10.5–11.0). A precipitate of a deep purple solid, Co(imidazolate)$_2$ was formed. This product was filtered from solution onto a fritted glass filter, washed with distilled H$_2$O three times, twice with absolute ethanol and once with anhydrous diethyl ether, and allowed to dry in air. Calculated: 30.5% Co; found: 30.4% Co.

Preparation of mercury(II) imidazolate

A solution of 27.2 g. HgCl$_2$ in 600 ml. distilled water was combined with a solution of 13.6 g. imidazole in 100 ml. water. The mixture was stirred continuously while a 1 M NaOH solution was added until a pH of 10.0–11.0 was reached. The white solid mercury(II) imidazolate precipitated and was filtered onto a fritted glass filter, washed three times with distilled H$_2$O, twice with absolute ethanol and once with anhydrous diethyl ether and allowed to dry in air. Calculated: 19.9% Hg; found: 55.2% Hg.

Preparation of copper(II) imidazolate

Imidazole (4 gm.) was dissolved in 100 ml. of a 0.05 M Cu(NO$_3$)$_2$ solution. Sodium hydroxide solution (0.1 M) was added dropwise until a reddish purple precipitate, copper(II) imidazolate, was formed. The precipitate was filtered, washed three times with distilled H$_2$O, twice with absolute ethanol and once with anhydrous diethyl ether, and dried in air. Calculated: 32.1% Cu; found: 31.5% Cu.

Preparation of copper(I) imidazolate

A solution of 24.2 g. Cu(NO$_3$)$_2$·3H$_2$O and 13.6 g. imidazole in 500 ml. H$_2$O was prepared, stirred continuously. Ascorbic acid (10 g.) and sodium sulfite (0.25 g.) were alternately added in small amounts until the solution color had changed from deep blue to very pale yellow, indicating a reduction of Cu(II) to Cu(I). About 200 ml. of 1.0 M NaOH was added which caused precipitation of a white solid. The solid was collected on a fritted glass filter, washed three times with distilled H$_2$O, twice with absolute ethanol and once with anhydrous diethyl ether, and dried in air. Calculated: 48.6% Cu; found: 47.5% Cu.

Preparation of zinc(II) imidazolate

Perchloric acid (70%) was added dropwise to a stirred suspension of 12.5 gm. ZnCO$_3$ in 200 ml. of distilled water until the evolution of CO$_2$ ceased. Imidazole (6.8 gm.) in 50 ml. distilled water was slowly added to the resultant zinc(II) perchlorate solution, and a white precipitate formed. Fifty ml. of 0.5 M NaOH solution was slowly added, and a sticky yellow-white substance coated the bottom and sides of the beaker. The free suspension was decanted into 500 ml. of distilled H$_2$O, and a fluffy white solid was precipitated immediately. The product, zinc(II) imidazolate, was filtered from solution, washed three times with H$_2$O, twice with absolute ethanol and once with anhydrous diethyl ether, and dried in air. Calculated: 32.8% Zn; found: 31.1% Zn.

EXAMPLE 4

Various metal substituted imidazolates were tested as catalysts for epoxy resin-curing agent systems. Five grams of "Epon" 828 (see Example 1) and dicyandiamide (0.35 g.) were mixed with 0.025 g. of a variety of silver(I) imidazolates wherein the imidazole nucleus was substituted at the 2,4- and/or 5-positions. The gel time of the mixture was determined at 150° C. and the results are tabulated below.

| Test | Catalyst | Gel time in minutes:seconds | | |
|---|---|---|---|---|
| | | Trial #=1 | Trial #=2 | Trail #=3 |
| Control | No catalyst | 25:00 | 30:00 | |
| 1 | Silver(I) 2-methylimidazolate | 1:55 | 2:05 | 2:10 |
| 2 | Silver(I) 2-ethyl-4-methylimidazolate | 1:05 | 1:20 | 1:10 |
| 3 | Silver(I) benzimidazolate | 4:40 | 5:40 | 5:50 |

Preparation of silver(I) 1-methylimidazolate

Silver nitrate (16.9 g.) was dissolved in distilled water and 8.3 g. of 2-methylimidazole was added to it. The mixture was stirred continuously. Concentrated ammonium hydroxide (15–20 ml.) was then added to the mixture. The white solid product was filtered onto a Buchner funnel, washed once with distilled water, twice with absolute ethanol and once with ether, and allowed to dry in air.

Preparation of silver(I) 2-ethyl-4-methylimidazolate

To a mixture of equimolar amounts of AgNO₃ and 2-ethyl-4-methylimidazole in distilled water, was added with stirring concentrated NH₄OH to a pH greater than 10. The white product was washed once with distilled water, twice with absolute ethanol and once with ether and dried in air.

Silver(I) benzimidazolate

Silver(I) salicylate (7.35 g.) in 150 ml. of dimethylsulfoxide (DMSO) was added to a solution of 3.54 g. benzimidazole in 100 ml. DMSO. The mixture was diluted with water, and immediately a white solid was precipitated. The product, silver(I) benzimidazolate, was filtered from solution into a fritted glass filter, washed twice with water, twice with absolute ethanol and one with ether, and then dried in air.

EXAMPLE 5

A comparison of the storability of epoxy resin systems was carried out as follows:

(A) Ten grams of "Epon 828" (see Example 1) and dicyandiamide (0.7 g.) were placed in an oven at 54° C. After one month, no evidence of gelation or curing was observed.

(B) Nickel(II) imidazolate (0.05 g.) was added to "Epon" 828 (10 g.) and dicyandiamide (0.7 g.) and the mixture was placed in an oven at 54° C. After one month, no cure was observed. A portion of the mixture was removed and placed in a small beaker on a hot plate maintained at 150° C. The system observed to be "cured" after about five minutes of the hot plate treatment.

(C) Imidazole (0.0025 g.) added to "Epon" 828 (10 g.) and dicyandiamide (0.7 g.) and the mixture was placed in an oven at 54° C. After 16 hours at this temperature, the resin was observed to be "cured."

In these three experiments, the term "cured" is used to denote the most advanced stage of hardening, while the term "gelation" denotes the initial "set" of the resin. (A "gelled" epoxy resin is generally only partly "cured.") These experiments indicate that: First, the epoxy/dicyandiamide composition is latent at moderately elevated temperatures below 55° C. Second, the nickel imidazolate does not destroy this latency, but free imidazole does. Third, despite the latency of the epoxide/dicyandiamide/nickel imidazolate composition at 54° C., the nickel imidazolate does provide a catalytic effect at 150° C.; compare Examples 1 and 2.

EXAMPLE 6

Ten grams of "Epon" 828 (see Example 1) and nickel(II) imidazolate (1.6 gm.) were mixed together in a small beaker and placed on a hot plate maintained at 150° C. After one hour, on the hot plate, absolutely no cure was noted. In contrast,"Epon" 828 (10 g.), dicyandiamide (0.7 g.) and nickel(II) imidazolate (0.1 g.) mixed together and placed on the same hot plate was observed to be "cured" (see Example 5) in approximately three minutes. This Example provides evidence indicating that nickel(II) imidazolate is a catalyst for the curing reaction, but it does not liberate free imidazole at 150° C. Compare Example 5(C).

EXAMPLE 7

A room temperature curable, two-part epoxy system having a Part A consisting of "ZZL–2807" (trade designation of Union Carbide Corp. for a polyamine curative which is effective with aliphatic epoxides at room temperature) and a Part B consisting of "ERL–2795" (trade designation of Union Carbide Corp. for diglycidyl ether of Bisphenol A diluted with 13 wt. percent butyl glycidyl ether) was admixed and evaluated with and without nickel(II) imidazolate. At room temperature, within one-half hour, and the sample mixture containing Part A, Part B, and nickel(II) imidazolate was hard and non-tacky, whereas a mixture of Parts A and B without the nickel(II) imidazolate required at least an hour to reach the same state of cure.

What is claimed is:

1. A composition comprising a curable epoxy resin and a metal imidazolate catalyst of the formula:

$$ML_m$$

wherein

M is a metal selected from the group of Ag(I), Cu(I), Cu(II), Cd(II), Zn(II), Hg(II), Ni(II) and Co(II),
L is an imidazolate of the formula

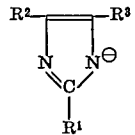

wherein R¹, R², and R³ are selected from a hydrogen atom, an alkyl radical or aryl radical and,
m is the valence of M.

2. A composition according to claim 1 wherein R² and R³ together comprise the atoms of a fused aromatic ring.

3. A composition according to claim 1 wherein said composition further comprises a curing agent for said curable epoxy resin, and curing agent latent being capable of curing said epoxy resin to a thermoset solid at curing temperatures above 100° C.

4. A composition according to claim 3 wherein said latent curing agent is selected from the group consisting of a carboxylic acid anhydride, dicyandiamide or a derivative thereof, a diaminodiarylsulfone, and a compound containing the hydrazide function or an epoxide-curing derivative thereof.

5. A composition according to claim 1 wherein said curable epoxy resin is selected from the group consisting of a polyglycidyl ether of a polyhydric phenol or aliphatic polyol and a cycloaliphatic epoxide monomer or prepolymer containing at least one 5- or 6-membered cycloaliphatic ring.

6. A composition according to claim 1 wherein said metal imidazolate catalyst is selected from the group consisting of nickel(II) imidazolate, cobalt(II) imidazolate, copper(I) and copper(II) imidazolate, and zinc(II) imidazolate.

7. A composition according to claim 1 wherein said metal imidazolate catalyst is present in less than a stoichiometric amount but at least a catalytic amount.

8. A composition comprising: a diglycidyl ether of Bisphenol A, an aliphatic dihydrazide, and a catalytic amount of a catalyst selected from the group consisting of silver(I) imidazolate, copper(I) imidazolate, copper (II) imidazolate, cadmium(II), imidazolate, zinc(II) imidazolate, mercury(II) imidazolate, nickel(II) imidazolate, and cobalt(II) imidazolate.

9. An improved latent curing agent composition for curing of vicinal epoxide monomers or prepolymers comprising:
a latent curing agent capable of curing an aliphatic, cycloaliphatic, aromatic, or heterocyclic epoxide monomer or prepolymer to a thermoset solid at temperatures in the range of 100-200° C., and
a metal imidazole catalyst of claim 1.

10. A composition according to claim 9 wherein said latent curing agent is selected from the group consisting of a carboxylic acid anhydride, a dihydrazide, dicyandiamide or a derivative thereof, and a diaminodiarylsulfone.

11. A component of a curable epoxy resin composition comprising: (1) a metal imidazolate catalyst of claim 1, and (2) at least one part of a curable epoxy resin composition capable of being cured to a thermoset solid by a curing agent having at least as much reactivity with a vicinal epoxide ring as an anhydride of a dicarboxylic acid.

12. A method of curing an epoxy resin comprising the step of: contacting said epoxy resin with a metal imidazolate catalyst of claim 1.

13. A method according to claim 12 wherein said epoxy resin is mixed with a curing agent which is at least as reactive toward a vicinal epoxide ring as a dianhydride of a dicarboxylic acid and which does not de-stabilize said metal imidazolate catalyst.

14. A method according to claim 13 wherein said curing agent is latent at room temperature and wherein said method comprises the further step of heating said epoxy resin, said curing agent, and said metal imidazolate catalyst to a curing temperature in the range of 100-200° C. until said epoxy resin is converted to a thermoset solid.

References Cited

UNITED STATES PATENTS

| | | | |
|---|---|---|---|
| 3,356,645 | 12/1967 | Warren | 260—47 |
| 3,553,166 | 1/1971 | Anderson et al. | 260—47 |
| 3,677,978 | 7/1972 | Dowbenko et al. | 260—2 EP |
| 3,678,007 | 7/1972 | Dowbenko et al. | 260—47 EN |
| 3,474,045 | 10/1969 | Vandenberg et al. | 260—2 A |

OTHER REFERENCES

Lee & Neville: "Handbook of Epoxy Resins," pp. 1-2, McGraw-Hill, 1967.

Lee & Neville: "Handbook of Epoxy Resins," pp. 7-4, McGraw-Hill, 1967.

Webster Seventh New Collegiate Dictionary, p. 203, G & C Merriam Co., 1965.

WILLIAM H. SHORT, Primary Examiner

E. A. NIELSEN, Assistant Examiner

U.S. Cl. X.R.

260—2 EC, 2 N, 18 EP, 78.4 EP